United States Patent [19]

Oda

[11] 4,051,916
[45] Oct. 4, 1977

[54] APPARATUS FOR MOUNTING INSTRUMENT TO INSTRUMENT PANEL IN MOTOR VEHICLE

[75] Inventor: Takaaki Oda, Musashimurayama, Japan

[73] Assignee: Nissan Motor Company, Limited, Japan

[21] Appl. No.: 643,610

[22] Filed: Dec. 22, 1975

[51] Int. Cl.$^2$ ............................................. B60K 20/08
[52] U.S. Cl. .................................... 180/90; 200/295; 248/27.1; 280/752
[58] Field of Search ...................... 180/90; 339/126 R; 248/27.1; 200/295, 293, 300; 74/492, 493; 280/748, 752

[56] References Cited

U.S. PATENT DOCUMENTS

| 2,110,130 | 3/1938 | Doane et al. ............ 339/126 X |
| 2,565,327 | 8/1951 | Shaw ......................... 248/27.1 X |
| 3,182,162 | 5/1965 | Gelfand et al. ........... 180/90 X |
| 3,586,796 | 6/1971 | Simonvits ................... 200/295 |
| 3,645,353 | 2/1972 | Cope et al. ................... 180/90 |
| 3,662,850 | 5/1972 | Foley ............................ 180/90 |

FOREIGN PATENT DOCUMENTS

| 2,253,559 | 11/1972 | Germany ...................... 180/90 |

Primary Examiner—Robert R. Song
Assistant Examiner—Donn McGiehan
Attorney, Agent, or Firm—Robert E. Burns; Emmanuel J. Lobato; Bruce L. Adams

[57] ABSTRACT

A means is disclosed for holding an instrument having a knob, in a projected operative position from an instrument panel of a vehicle. The instrument holding means comprises at least one projection, a plurality of bolts screwed into each projection. The bolts have shank portions, respectively, which extend in parallel with each other. A flange is secured to the instrument. Springs mounted around the shank portions are compressed to bias the flange into abutting engagement with the projections.

1 Claim, 26 Drawing Figures

APPARATUS FOR MOUNTING INSTRUMENT TO INSTRUMENT PANEL IN MOTOR VEHICLE

BACKGROUND OF THE INVENTION

The present invention relates to a motor vehicle, and more particularly to a motor vehicle having an instrument panel provided with instruments such as swithes, radios or the like.

Conventionally, in a motor vehicle, a plurality of switches are installed in an instrument panel by rigidly securing their bodies to the panel with their knobs projecting into the passenger compartment. If the motor vehicle is subjected to a rapid deceleration or involved in a collision, a driver or passenger in the passenger compartment is likely to hit hardly against the knobs which project into the passenger compartment. With this prior art therefore there is the danger that the driver may be hurt by the knobs since the switches are rigidly secured to the instrument panel.

SUMMARY OF THE INVENTION

The present invention aims at solving the above mentioned problem in the prior art and it is an object of the present invention to provide a motor vehicle in which an instrument is installed in an instrument panel in such a manner that when a passenger's body hits against a knob of the instrument projecting into the passenger compartment with a great force, the knob of the instrument will go deeply into the instrument panel.

BRIEF DESCRIPTION OF THE DRAWINGS

The present invention will now be described in more detail with reference to the accompanying drawings, in which.

DESCRIPTION OF THE PREFERRED EMBODIMENTS

Referring to the accompanying drawings in which like reference numerals are used to designate like parts throughout all figures.

Figures 1, 2:
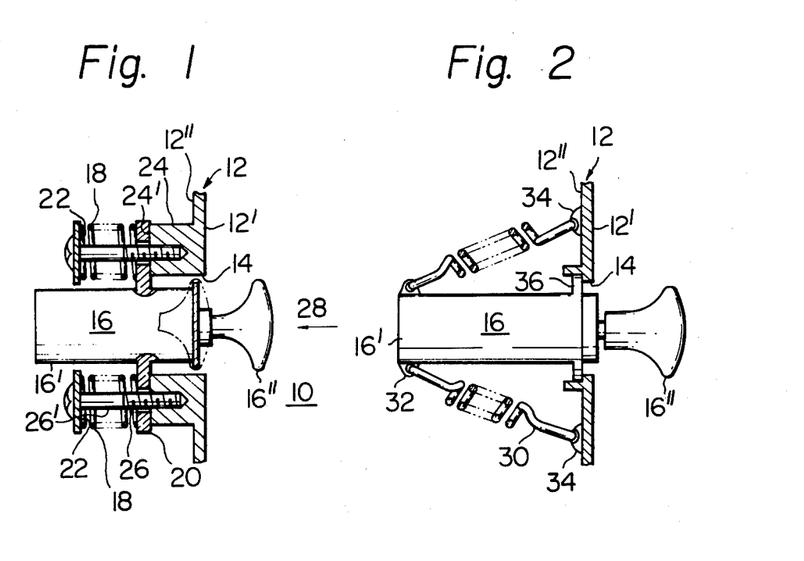
FIG. 1 is a sectional diagrammatic view of a portion of an instrumental panel in a motor vehicle, showing the first embodiment according to the present invention.
FIG. 2 is a diagrammatic view showing a second embodiment according to the present invention.

Referring now to FIG. 1 of the accompanying drawings a first embodiment according to the present invention is illustrated, in which a passenger compartment of a motor vehicle is generally indicated at 10. An instrument panel 12 has a surface 12' exposed to the passenger compartment 10 and an opposite surface 12" and it has an opening 14 formed therethrough. An instrument takes the form of a switch 16 having a body 16' and a knob 16". The switch body 16' is disposed on the opposite side of the instrument panel 12 to the passenger compartment 10 and the knob 16" projecting into the passenger compartment 10 through the opening 14.

To hold the switch 16 in the illustrated position which will hereinafter be referred to as an operative position and to provide an arrangement whereby upon application of a force exceeding a predetermined value on the knob 16" in a sense tending to move the switch 16 toward the instrument panel 12, the switch moves deeply into the instrument panel 12, a plurality of springs 18 are compressed between a flange 20 secured to the switch body 16' and spring retainers 22 to yieldably bias the flange 20 into abutting engagement with a surface 24' formed on an annular projection 24 secured to the surface 12" of the instrument panel 12. The springs 18 are mounted around the shank portions 26' of screws 26 which are screwed into the projection 24 and which extend in parallel with each other. The flange 20 is formed with openings through which the shank portions 26' extend, respectively.

The operation of FIG. 1 embodiment is as follows. When a force exceeding a predetermined value is applied in a direction of an arrow 28 on the knob 16", the switch 16 will move deeply into the instrument panel 12, compressing the springs 18, toward a safe position (indicated by imaginary lines) in which the knob 16" is recessed from the passenger compartment 10.

FIG. 2 illustrates a second embodiment according to the present invention. This embodiment is different from the FIG. 1 embodiment in that a plurality of tension springs 30, instead of the compression springs 18, are employed to yieldably bias a switch 16 toward an operative position. The springs 30 are extended between ears 32 secured to the switch body 16' and anchors 34 secured to a surface 12" of an instrument panel 12 around an opening 14 to yieldably bias a flange 36 of the switch body 16" into abutting engagement with the surface 12".

Figures 3, 4:
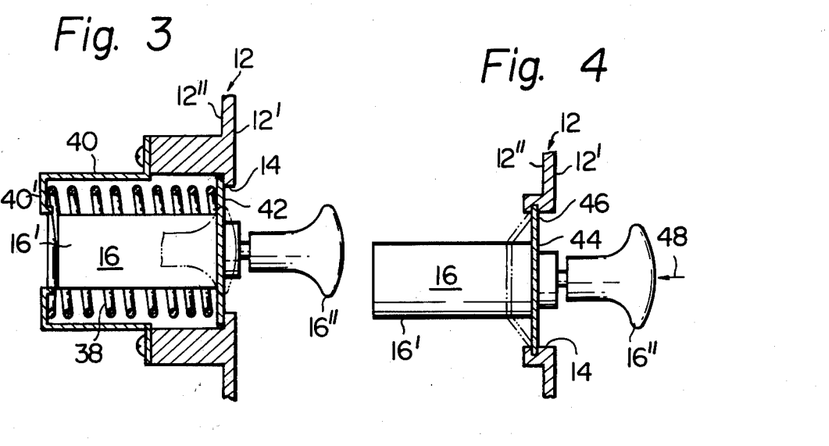
FIG. 3 is a diagrammatic view showing a third embodiment according to the present invention.
FIG. 4 is a diagrammatic view showing a fourth embodiment according to the present invention.

A third embodiment illustrated in FIG. 3 is different from the FIG. 1 embodiment in that a spring 38, instead of the plurality of springs 18, is compressed in a casing 40 to yieldably bias a switch 16 toward an operative position. A safe position of the switch 16 is indicated by imaginary lines in this Figure. The casing 40 is secured to an instrument panel 12 and houses a switch body 16'. The spring 38 is compressed between an annular end 40' of the casing 40 and a flange 42 secured to the body 16 to yieldably bias the flange 42 into abutting engagement with a surface 12" of the instrument panel 12.

A fourth embodiment illustrated in FIG. 4 is different from the FIG. 1 embodiment in that a plate 44 made of a resilient material, instead of the compression spring 18, is secured to a switch body 16' and has its rim fitted into a groove 46 formed in an instrument panel 12 in order to yieldably bias a switch 16 toward an operative position. When a force exceeding a predetermined value is applied in a direction of an arrow 48 on knob 16", a switch 16 will move deeply into the instrument panel, deforming the plate 44 to a position indicated by imaginary lines, and further movement in this direction will cause the plate 44 to come off the groove 46, with the result the switch 16 drops out of the instrument panel 12.

Figure 5:
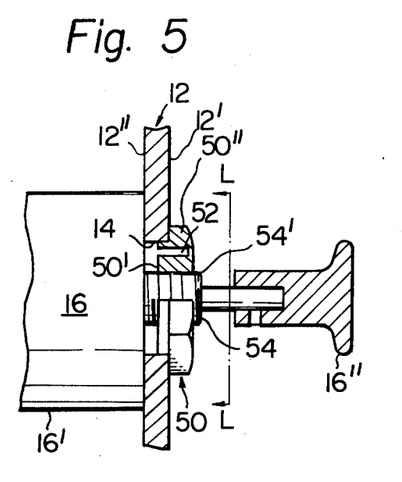
FIG. 5 is a diagrammatic view showing a fifth embodiment according to the present invention.
Figure 6:
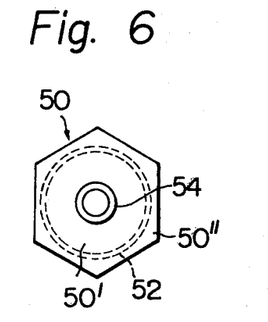
FIG. 6 is a sectional view taken through the section line L—L of FIG. 5.

Referring to FIGS. 5 and 6 there is shwon a fifth embodiment according to the present invention. This embodiment is different from the FIG. 1 embodiment in that instead of the springs 18, a breakable nut 50 is used. The nut 50 is threaded on a male screw 54' formed on a collar 54 projecting from that end of a switch body 16' which is in abutting engagement with a second surface 12" of an instrument panel 12. The nut 50 has a body portion 50' fitted in an opening 14 of the instrument panel 12 and an integral header 50" with a first surface 12' of the instrument panel 12. As best seen in FIG. 6 the body portion 50' of the nut 50 has an annular groove 52. The annular groove 52 is disposed around the collar 54 so that upon application of a force exceeding a predetermined value on a knob 16" in a direction of an arrow 54, the body portion 50' is separated from the header 50", with the result a switch 16 is released or separated from the instrument panel 12.

Figure 7:
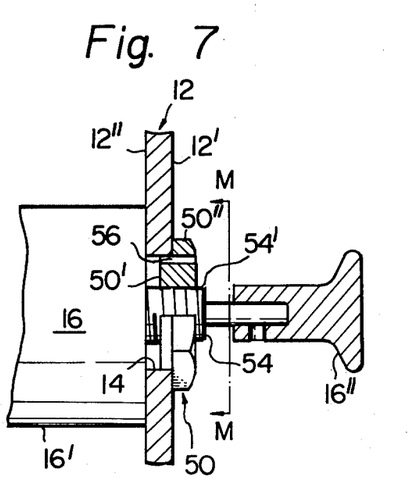
FIG. 7 is a diagrammatic view showing a sixth embodiment according to the present invention.
Figure 8:
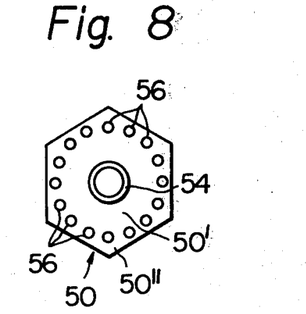
FIG. 8 is a diagrammatic sectional view taken through the section line M-M of FIg. 7.

A sixth embodiment shown in FIGS. 7 and 8 is different from the embodiment shown in FIGS. 5 and 6 in that instead of the annular groove 52, a body portion 50' of a nut 50 has a plurality of openings 56 which are arranged in a circle around a collar 54.

Figure 9:
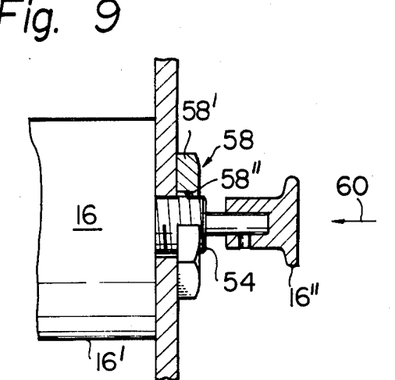
FIG. 9 is a diagrammatic view showing a seventh embodiment according to the present invention.

A seventh embodiment shown in FIG. 9 is different from the fifth embodiment in that instead of the nut 50, a nut 58 threaded on a male screw 54' on a collar 54 has a relatively thick rim portion 58' and a relatively thin central portion 58". The rim portion 58' engages with a surface 12' of an instrument panel and the thin center portion 58" extends around the collar 54. In this embodiment the thin center portion 58" breaks upon application of a force exceeding a predetermined value on a knob 16" of a switch 16 in a direction of an arrow 60 with the result that the switch 16 is released from an instrument panel 12.

Figures 10, 11:
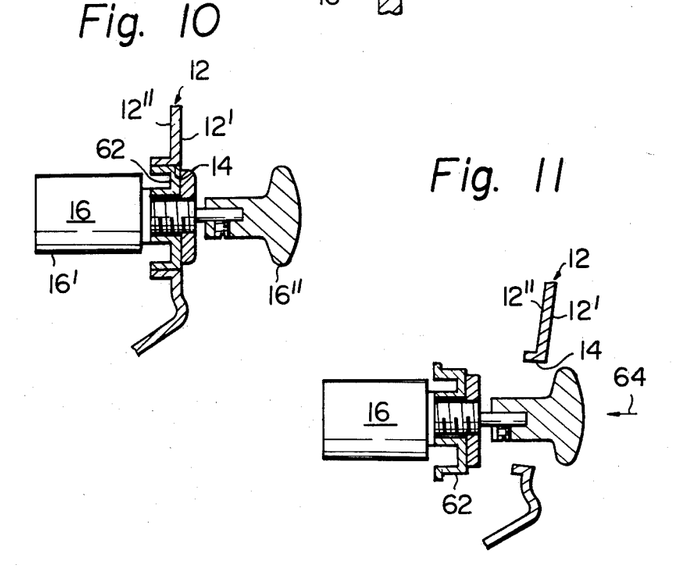
FIG. 10 is a diagrammatic view showing an eighth embodiment according to the present invention with a switch in an operative position.
FIG. 11 is a view showing the eigth embodiment of FIG. 10 with the switch in a safe position.

An eighth embodiment shown in FIGS. 10 and 11 is different from the FIG. 1 embodiment in that an attachment piece 62 secured to a body portion 16' of a switch 16 by a screw and a nut is press fitted in an opening 14 of an instrument panel 12. The attachment piece 62 is press fitted in the opening 14 in such a manner that upon application of a force exceeding a predetermined value, on a knob 16" of a switch body in a direction of an arrow 64 (see FIG. 11), the switch drops out of an instrument panel 12 as shown in FIG. 11.

Figure 12:
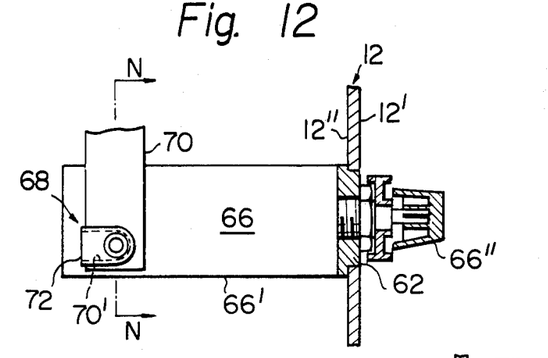
FIG. 12 is a diagrammatic view showing a ninth embodiment according to the present invention with a radio in an operative position.
Figure 13:
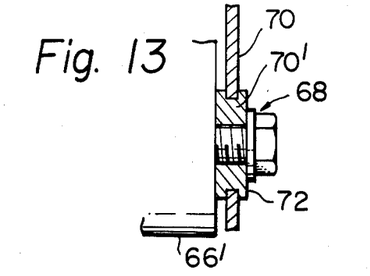
FIG. 13 is a sectional view taken through the section line N—N of FIG. 12.
Figure 14:
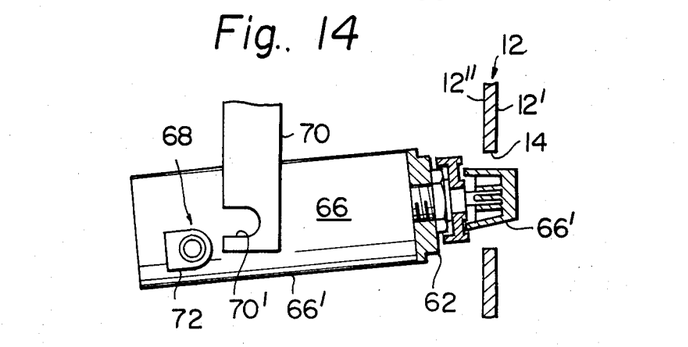
FIG. 14 is a view showing the ninth embodiment in FIG. 12 with the radio in a safe position.

A ninth embodiment shown in FIGS. 12 through 14 is different from the FIG. 10 embodiment in that the instrument takes the form of a radio 66 having a body 66' and a knob 66" and in that a one-way bracket 68 is provided to support the instrument 66 in a manner preventing projection of the instrument 66 beyond the illustrated operative position, but permitting movement of the instrument 66 toward a position illustrated in FIG. 14. The supporting means 68 includes a bracket 70 suspended from a suitable fixed portion (not shown) and provided with a notch 70'. A member 72 is secured to an end portion of the body 66' remote from an attachment piece 62. The member 72 is received in the notch 70' in such a manner as to provide an arrangement whereby when the body 16 moves to the left hand side as viewed in FIG. 12 the member 72 drops out of the bracket 70 (see FIG. 14). It will be noted that the radio 66 is supported at one end by an attachment piece 62 press fitted in the opening 14 and also supported at the opposite end by the one-way bracket 68.

Figure 15:
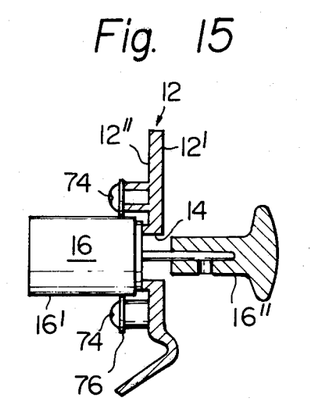
FIG. 15 is a diagrammatic view showing a tenth embodiment according to the present invention with a switch in an operative position.
Figure 16:
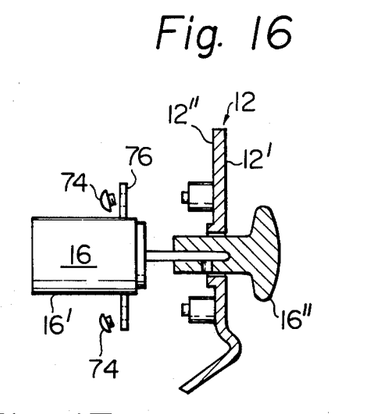
FIG. 16 is a view showing the tenth embodiment in FIG. 15 with the switch in a safe position.

A tenth embodiment shown in FIGS. 15 and 16 is different from the FIG. 1 embodiment in that two shearable fixers 74 made of a synthetic resin fix a switch to an instrument panel 12. Two diametrically opposed hubs 76 are secured to a switch body 16' and the shearable fixers 74 fix the hubs 76 to the instrument panel 12. The shearable fixers 74 breaks upon application of a force exceeding a predetermined value to assume the position illustrated in FIG. 16.

Figures 17, 18:
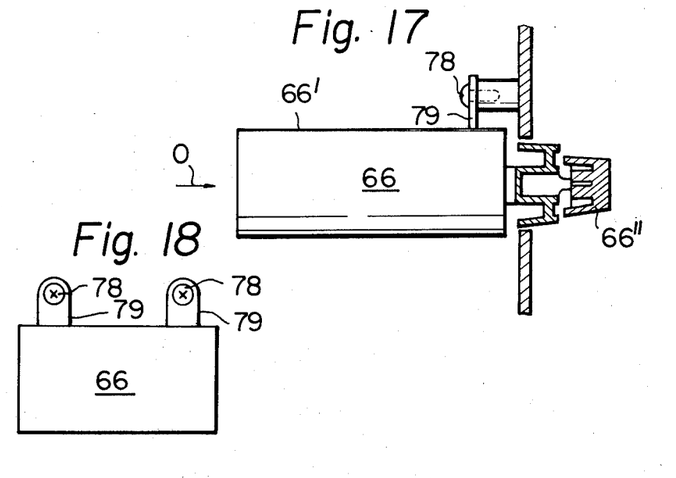
FIG. 17 is a diagrammatic view showing an eleventh embodiment according to the present invention.
FIG. 18 is a plan of viewed the eleventh embodiment along a direction designated by an arrow O in FIG. 17.

An eleventh embodiment shown in FIGS. 17 and 18 is different from the tenth embodiment in that two shearable fixers 78 fix two hubs 79 extending from a body 66' of a radio 66 in the same direction, to an instrument panel 12.

Figures 19, 20:
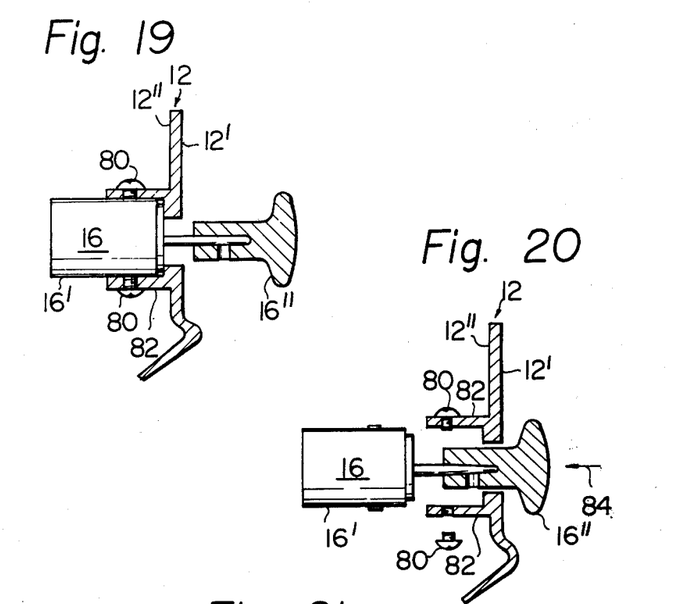
FIG. 19 is a diagrammatic view showing a twelveth embodiment according to the present invention with a switch in an operative position.
FIG. 20 is a diagrammatic view showing the embodiment in FIG. 19 with the switch in a safe position.

A twelveth embodiment shown in FIGS. 19 and 20 is different from the embodiment shown in FIGS. 15 and 16 in that two shearable fixers 80 fix two projections 82 extending in the same direction from an instrument panel 12 to a body 16' of a switch 16. Thus application of a force exceeding a predetermined value to a knob 16" in a direction of an arrow 84 (see FIG. 20) causes a switch 16 to assume a safe position shown in FIG. 20 by breaking the shearable fixers 82.

Figure 21:
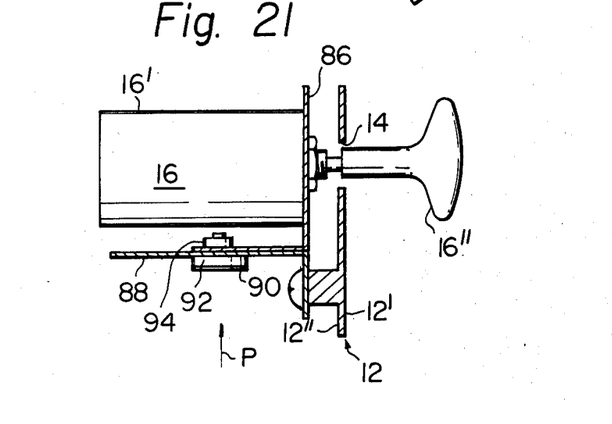
FIG. 21 is a diagrammatic view showing a thirteenth embodiment according to the present invention.
Figure 22:
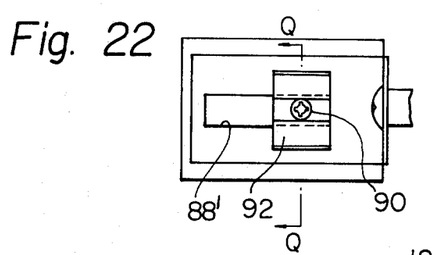
FIG. 22 is a plan view of the embodiment in FIG. 21 viewed in a direction designated by an arrow P in FIG. 21.
Figure 23:
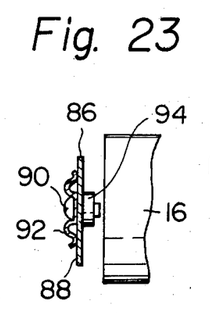
FIG. 23 is a sectional view taken through section line Q—Q of FIG. 22.

A thirteenth embodiment shown in FIGS. 21 through 23 is different from the FIG. 1 embodiment in that an L-shaped panel 86 secured to a switch body 16' is mounted on a bracket 88 secured to an instrument panel 12 for movement along an elongated guide slot 88' formed in the bracket 88 (see FIG. 22) by means of a bolt 90 having a shank (not shown) extending through a spring 92 and a slot 88' and threadably engaged by a nut 94. The bolt 90, spring 92 and 94 are constructed and arranged such that frictional contact between the spring 90 with the bracket 88 prevents relative movement between the L-shaped panel 86 and the bracket 88 along the slot 88' when applied force to a knob 20 in a direction of an arrow 96 is below a predetermined value and the application of a force exceeding the predetermined value on the knob 16" causes movement of the L-shaped panel 86 relative to the bracket 88 in a direction along the slot 88'. Although the slot 88' is closed in this embodiment so that dropping of a switch 16 is prevented, the slot 88' may be opened toward the left hand side as viewed in FIG. 22 so that the switch 16 will be drop from the instrument panel 12 upon the application of a force exceeding the predetermined value.

Figure 24:
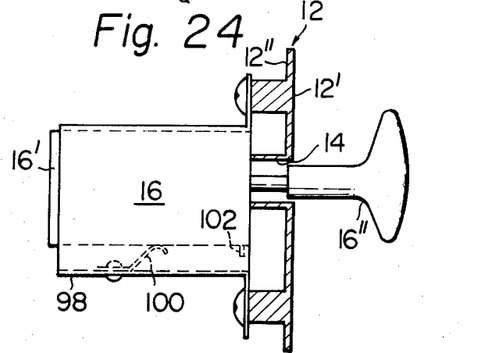
FIG. 24 is a diagrammatic view showing a fourteenth embodiment according to the present invention.
Figure 25:
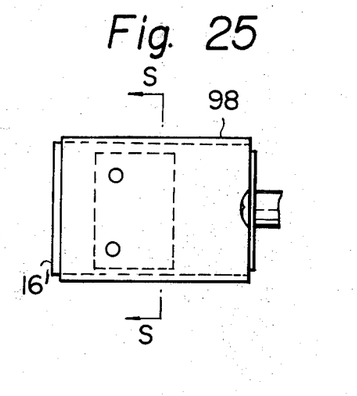
FIG. 25 is a plan view of the embodiment in the FIG. 24 along a direction designated by an arrow R in FIG. 24.
Figure 26:
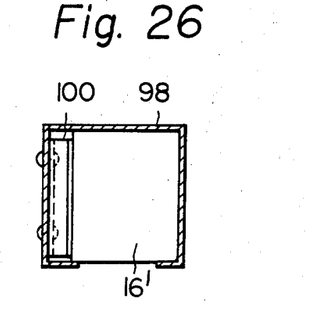
FIG. 26 is a sectional view taken through section line S—S of FIG. 25.

Referring lastly to FIGS. 24 through 26 a fourteenth embodiment shown in these Figures is different from the FIG. 1 embodiment in that a cylindrical bracket 98 secured to an instrument panel 12 slidably accommodate therein a switch body 16' of a switch 16 and a spring 100 is secured to the cylindrical bracket in frictional contact relation with the switch body 16' to resist slidable movement of the switch body 16' relative to the bracket 98. A stop 102 is secured to the switch body 16' to prevent dropping of the switch body 16 from the cylinder by engaging the spring 100. Such stop 12 may be eliminated if it is desired to have an arrangement whereby a switch 16 will drop out of the instrument panel 12 upon the application of a force exceeding a predetermined value on a knob 20 during a vehicle collision.

In design, it is desirable that the application of a force exceeding a predetermined value of 37.8 daN (38.6 kg, 85 pounds) on a knob of an instrument in a sense tending to move the knob toward the instrument panel causes the knob to go deeply into the instrument panel.

It is to be noted as an advantage of the present invention that since a knob projecting from an instrument panel will go deeply into the instrument panel when a driver hits against the knob during a vehicle collision or deceleration according to the present invention, the configuration of the instrument panel can be simplified, with the result that manufacturing cost of the instrument panel reduces.

What is claimed is:

1. In a motor vehicle having a passenger compartment:
    an instrument panel having a first surface, on one side thereof, exposed to the passenger compartment and a second surface, on the other side thereof, the instrument panel having an opening formed therethrough;
    an instrument mounted to said instrument panel having a body disposed in an area on the said other side of said instrument panel and a knob projecting from the body into the passenger compartment through the opening formed throught the instrument panel;
    means for holding the instrument in an operative position in which the knob projects into the passenger compartment by a predetermined amount from the first surface, but permitting the instrument to move in a sense tending to retract the knob from the passenger compartment upon application of a force exceeding a predetermined value on the instrument in a sense tending to move the instrument toward the opening of the instrument panel;
    the instrument holding means including at least one projection on the second surface of the instrument panel adjacent the opening of the same; a plurality of bolts screwed into the projection, the bolts having shank portions, respectively, which extend in parallel with each other; a flange secured to the instrument, the flange being slidably mounted on the shank portions; and springs mounted around the shank portions, respectively, the springs being compressed to bias the flange into abutting engagement with the projection.

* * * * *